US007636606B2

(12) United States Patent
Dold et al.

(10) Patent No.: US 7,636,606 B2
(45) Date of Patent: Dec. 22, 2009

(54) METHOD AND A SYSTEM FOR CONTROLLING A PROCESS DEVICE

(75) Inventors: Franz Dold, Furtwangen (DE); Irina Hippenmeyer, March (DE)

(73) Assignee: Sick AG, Waldkirch (DE)

( * ) Notice: Subject to any disclaimer, the term of this patent is extended or adjusted under 35 U.S.C. 154(b) by 226 days.

(21) Appl. No.: 11/890,711

(22) Filed: Aug. 7, 2007

(65) Prior Publication Data

US 2008/0051913 A1 Feb. 28, 2008

(30) Foreign Application Priority Data

Aug. 10, 2006 (EP) ................... 06016718

(51) Int. Cl.
*G05B 9/02* (2006.01)
*G05B 15/00* (2006.01)
*G05B 11/01* (2006.01)
*G06F 11/00* (2006.01)

(52) U.S. Cl. ................ 700/79; 700/1; 700/12; 700/21; 700/80; 714/24; 714/25; 714/26; 701/45

(58) Field of Classification Search ...... 700/1, 700/12, 21, 79–80; 714/24–26; 361/1; 701/45
See application file for complete search history.

(56) References Cited

U.S. PATENT DOCUMENTS 3,598,975 A * 8/1971 Miller et al. ................. 700/10

(Continued)

FOREIGN PATENT DOCUMENTS

DE 4242492 A1 12/1992

(Continued)

OTHER PUBLICATIONS

European Search Report dated Feb. 5, 2007 relating to European Patent Application No. 06 016 718.6; 4 pages.

(Continued)

*Primary Examiner*—Ramesh B Patel
(74) *Attorney, Agent, or Firm*—Harness, Dickey & Pierce, P.L.C.

(57) ABSTRACT

The present invention relates to a method for process control, wherein at least one process device to be controlled is controlled by at least one process module and at least one safety module in that process signals of the process module not relevant to safety and safety signals of the safety module relating to process safety are logically linked to one another and at least one local safety signal of a local safety sensor is supplied directly to at least one control output of a local control unit associated with the process device while bypassing this logical linking operation in order to effect a fast change in state at the process device to be controlled which is connected to the control output, wherein the fast switching path includes a fast switching function with which the result of the logical linking operation and the local safety signal are evaluated together and wherein a fast change in state at the process device to be controlled effected via the fast changing path is changed again, and is in particular reversed again, when the common evaluation produces a predetermined result. The invention moreover relates to a system for process control, in particular for the carrying out of the method in accordance with the invention.

16 Claims, 2 Drawing Sheets

U.S. PATENT DOCUMENTS

| | | | | |
|---|---|---|---|---|
| 5,361,198 | A | * | 11/1994 | Harmon et al. ............... 700/83 |
| 5,543,997 | A | * | 8/1996 | Ruprecht .................... 361/100 |
| 5,625,266 | A | * | 4/1997 | Stark .......................... 318/466 |
| 6,837,363 | B2 | * | 1/2005 | Munzebrock et al. .... 198/502.1 |
| 6,898,468 | B2 | * | 5/2005 | Ott et al. ....................... 700/21 |
| 7,107,358 | B2 | * | 9/2006 | Vasko et al. ................ 709/249 |
| 7,269,465 | B2 | * | 9/2007 | Esch et al. .................... 700/21 |
| 2002/0126620 | A1 | * | 9/2002 | Heckel et al. ............... 370/216 |
| 2005/0113942 | A1 | * | 5/2005 | Longsdorf et al. ............ 700/79 |
| 2006/0111794 | A1 | * | 5/2006 | Wysuph et al. ................ 700/19 |

FOREIGN PATENT DOCUMENTS

| | | |
|---|---|---|
| DE | 19922561 A1 | 11/2000 |
| DE | 19925693 A1 | 12/2000 |
| DE | 19928517 C2 | 1/2001 |
| DE | 10201212 A1 | 7/2003 |
| DE | 10211938 A1 | 10/2003 |
| DE | 10211939 A1 | 10/2003 |
| DE | 102004018642 | 12/2005 |
| EP | 1589386 A1 | 10/2005 |
| WO | WO2005/106229 | 11/2005 |

OTHER PUBLICATIONS

Translation of European Search Report dated Feb. 5, 2007 relating to European Patent Application No. 06 016 718.6; 3 pages.

* cited by examiner

METHOD AND A SYSTEM FOR CONTROLLING A PROCESS DEVICE

The invention relates to a method and to a system for process control.

In many applications of automation and process engineering, not only does the process control have to control the actual working process, but safety aspects must also be taken into account. In the control of process devices, for example actuators, a combination of process data and safety data or a combination of the corresponding signals is, for example, necessary when movements of a machine part driven by an actuator which are critical to safety or which are dangerous for persons or also for capital goods should both be monitored by the actual process control and also switched off by the safety control in a case of emergency or disturbance.

Different methods for the combination of the process control with the safety control are already known:

In accordance with one method, the process control and the safety control are separate from one another: the control of the actual working process of the process device takes place by the process control. In the event of an error, the safety control switches the power supply of the process device off independently of the process control, whereby the process device runs out in an uncontrolled manner. Improved solutions exist in which actuators having so-called integrated safety are used which comprise separate switch inputs for the process control, on the one hand, and for the safety control, on the other hand.

In accordance with a further known method, the process logic, on the one hand, and the safety logic, on the other hand, are combined with one another in the safety control. The process data and the safety data are taken into account in the safety control in this process, with only a resulting signal being communicated to the process device to be controlled. The required exchange of data between the process control and the safety control is disadvantageous in this process. In practice, field bus systems are increasingly used so that, when this known method is used, a common communication protocol has to be implemented both in the process control and in the safety control.

A further known method proposes monitoring the data stream from the process control to the process device by the safety control. As with the known method described above, it is, however, disadvantageous here that the data of the process control have to be taken into account in the safety program of the safety control. Not only the calculation effort in the safety control is hereby increased, but a communication relationship between the process control and the safety control is moreover required.

It is furthermore problematic that the exchange of data of process data and safety data is frequently critical in the safety program, since there is the risk that, in particular due to the inexperience of the user, only unsafe input signals of the process control, which are not securely recorded, are used for safety functions. For example, a configuration can thus be accidentally realized in which a signal corresponding to an "emergency off" is read in at an unsafe input module and a dangerous movement of an actuator is hereby controlled due to the exchange of data in the safety control. This represents an unacceptable break in the safety chain for practical use.

A crucially improved manner of process control is known from the German patent application DE-A-10 2004 018642 of the applicant.

A local control unit which is made for the logical linking operation of the process signals and the safety signals is configured therein for the process device to be controlled, e.g. an actuator. The control unit processes the process signals and the safety signals and provides the result of the logical linking operation at its control output to which the actuator is connected. The control output of the control unit is consequently a safety-directed output which is controlled while taking account of the unsafe process signals which are also designated standard signals.

By this provision of the local control unit, an advantageous decentralization of the process control is achieved which in particular manages with a lower number of components. The logic of the control is so-to-say transposed into the decentralized, local control unit by the linking of the process signals with the safety signals in the local control unit. A monitoring for coincidence of process control and safety control in the local control unit can in particular take place by the logical linking operation of the process signals and the safety signals, whereby a particularly high degree of safety is achieved. It is furthermore of advantage that existing plants can be retrofitted simply by the installation of this control unit, and indeed while maintaining the existing modules for the process and safety control.

With respect to safety, this known method and this known system can be realized either in a so-called local configuration or in a so-called remote configuration. In the local variant, the safety module is directly connected to the control unit and is in particular arranged in the region of the control unit and thus of the process device to be controlled. In the remote variant, the safety module—like the process module—is connected to the control unit via a common communication system, in particular in the form of a field bus system.

It is in particular advantageous in the remote variant, that no communication relationship has to take place between the safety control and the process control for the linking of the process data with the safety data in the local control unit. Furthermore, no increased calculating power has to be kept available in the safety control for the logical linking operation of the signals. This makes it possible to offer the user a solution optimized with respect to the costs and to the performance.

It is furthermore of advantage that any errors which occur at the control output of the control unit can be simultaneously reported to the safety control and to the process control due to the two existing communication relationships between the control unit, on the one hand, and the safety control and the process control, on the other hand. It is in particular not necessary to carry an error diagnosis through from the control unit via the safety control to the process control.

In particular in the local variant, in which the safety module is directly connected to the control unit, it is of advantage for the process control to be able to access the error-safe control output of the control unit without further safety components having to be integrated into the existing communication system, in particular a field bus system, via which the process control communicates with the local control unit. A corresponding bus module can in particular be integrated into an existing, non-safe field bus system.

Since no additional safety control is required in the process system in addition to the safety module directly connected to the control unit, a substantial cost saving is produced for the user. A local safety input for the safety module provided at the local control unit can directly control the local safe control output of the control unit while taking account of the process signals.

Reference is generally made in another respect to DE 199 28 517 C2, DE 199 25 693 A1, DE 102 01 212 A1, DE 102 11 939 A1, DE 102 11 938 A1 and DE 199 22 561 A1 with respect to the prior art.

Despite the improvements already in particular achieved by the process control in accordance with DE-A 10 2004 018642, the disadvantage remains that the required signal processing, and in particular the logical processing, result in an increase in the response time of the safety sensors used. The data transfer accompanying the signal processing also increases the response times and thus the safety distances at the plants to be secured. It can be mentioned as an example that in applications with protective devices acting in a non-contact manner typical response times currently occur in the range from 70 to 300 ms, which corresponds to safety distances of approximately 60 cm. It is desirable to reduced these safety distances in a number of applications.

A further disadvantage which presents itself in connection with the use of safety bus systems comprises the fact that the data transfer rate in the safety signals is determined by the response time of the time-critical sensor. Time-critical sensors are in particular light grids which require a particularly low response time. A particularly fast data transfer over the safety bus system is thus also required which as a result produces a high bus load. The high bus load in turn has the consequence that the number of subscribers in the corresponding network is limited.

It is the object of the invention to make process controls as safe as possible in a manner which is as simple and as cost-favorable as possible, wherein the response time due to the system should moreover be as short as possible.

This object is satisfied, on the one hand, by the features of the independent method claim 1. Accordingly, the process signals of the process module not relevant to safety and the safety signals of the safety module relating to the process safety are logically linked to one another. At least one local safety signal of a local safety sensor is supplied directly to at least one control output of a local control unit associated with the process device while bypassing this logical linking operation via a fast switching path to effect a fast change in state at the process device to be controlled which is connected to the control output. In this connection, the fast switching path includes a fast switching function with which the result of the logical linking operation and the local safety signal are jointly evaluated, with a fast change in state effected via the fast switching path again being changed at the process device to be controlled and in particular being reversed again when or as soon as the joint evaluation produces a predetermined result.

The object underlying the invention is satisfied, on the other hand, by the features of the independent apparatus claim. Accordingly, the process device to be controlled is connected to the control output of a local control unit associated with the process device, with a logic module being provided in which process signals of the process module not relevant to safety and safety signals of the safety module relating to the process safety are able to be logically linked with one another. Furthermore, at least one local safety input is provided of which a local safety signal of a local safety sensor can be supplied directly to the control output of the control unit while bypassing the logic module to effect a fast change in state at the process device to be controlled. Furthermore, a fast switching module is provided with which the result of the logical linking operation and the local safety signal supplied over the local safety input can be evaluated together, with the fast switching module being configured to again change an effected fast change in state at the process device to be controlled, in particular to reverse it again, when or as soon as the common evaluation produces a predetermined result.

With respect to the process in accordance with the invention set forth above, the fast switching function is thus integrated into the fast switching module which thus forms a component of the fast switching path which also includes the local safety input and the control output of the local control unit (output module).

The at least one local safety signal which is used for the (fast) direct control of the control output or of the process device and the at least one local safety signal which is provided for the (slow) logical linking operation to at least one process signal can be identical, but do not have to be identical.

As in the initially explained process control in accordance with DE-A-10 2004 018642, a logical linking operation of the process signals and of the safety signals also takes place in accordance with the invention. However, in accordance with the invention, it is not a question of whether this logical linking operation takes place in a local control unit (also called an output module) associated with the process device to be controlled or at another position, for example in a central or higher ranking safety MPC. The local control unit can, but does not have to, be configured for the carrying out of the logical linking operation, i.e. the fast switching function in accordance with the invention is basically independent of the provision of a corresponding logic device inside the local control unit.

The invention is rather characterized in that a local safety signal, in particular a safety signal of a local safety sensor carrying out a monitoring or securing function, is provided and is supplied directly to the process device to be controlled, and indeed in particular via a control output of a local control unit (output module) associated with the process device.

This direct control of the process device in accordance with the invention by means of the local safety signal is here called a fast switching path which is characterized in that time-consuming signal run times and data processing steps, in particular the mentioned logical linking operation of the safety signals to the process signals, are avoided or bypassed. In this manner, an extremely fast change in state can be achieved at the process device to be controlled, for example its switching off. The response times with respect to corresponding safety sensors can be reduced in this manner, e.g. from the 70 to 300 ms mentioned above to approximately 1 to 10 ms, which is equivalent to a considerable reduction of the safety distances from approximately 60 cm to 2 cm.

The invention, however, goes beyond the fast control by means of a local safety signal in that a fast switching function is also provided which evaluates together the (slow) result of the logical linking operation between the process signals and the safety signals, on the one hand, and the (fast) local safety signal which is directly supplied to the process device to be controlled, on the other hand, and indeed with the aim of again changing the fast change in state at the process device to be controlled, for example its switching off, which was effected by means of the fast local safety signal, that is, for example, to switch the process device back on if the evaluation produces a specific result.

For example, the renewed change in state takes place when the control signal generated as the consequence of the logical linking operation of the process signals to the safety signals (result of the logical linking operation) presents the same signal curve as the local safety signal. If, for example, the common evaluation of the common evaluation of the control signal resulting from the logical linking operation and of the local safety signal carried out by the fast switching function has the result that the fast change in state was justified, that is the logical linking operation confirms or acknowledges the fast change in state—more or less subsequently—this can be required as a necessary requirement for the renewed change in state. The repeat change in state can e.g. actually only take place when the local safety sensor has again returned to its original state and when this state has also been confirmed or acknowledged by the logical linking operation. Only then are e.g. both signals, i.e. the control signal (result of the logical linking operation) and the local safety signal, active again, i.e. signal a "safe" state so that the renewed change in state can be triggered, that is e.g. the control output of the local control unit, can be released again, to switch a process device back on which is connected to the control output and was previously switched off fast.

Expressed in general terms, provision is therefore made in accordance with an embodiment that a fast change in state at the process device to be controlled is only changed again when the fast change in state is confirmed by the result of the logical linking operation, with the repeat change preferably only taking place when the local safety sensor has changed to a state, in particular a safe state, in accordance with a state before the transmission of the local safety signal and when this state has likewise been confirmed by the result of the logical linking operation.

Generally, the circumstance is utilized in accordance with the invention that the result of the logical linking operation reaches the location of the fast switching function later than the direct local safety signal due to the transmission and processing times is present in the system. This disadvantage of a signal delay, which should actually be eliminated by the invention, can thus advantageously be utilized for a so-called restart inhibit by which it is prevented that a further state change—in particular a switching back on—takes place too early subsequently to a fast change in state at the process device to be controlled effected by means of the fast local safety signal.

As already mentioned, a substantial advantage of the invention is the achievable reduction in the response time which is in particular in shown in connection with applications having protective devices acting in a non contact manner. The mentioned reductions to 1 to 10 ms—corresponding to a safety distance of approximately 2 cm—result in typical bus systems such as PROFSAFE, DEVICENEt Safety, SafetyBus p and also in other safety bus systems.

Since, in accordance with the invention, time critical signals, that is local safety signals e.g. from safety sensors, which require a very low response time, can be supplied directly to the process device to be controlled or to a local control unit to which the process device is connected, the problems likewise initially mentioned in connection with high bus loads are also eliminated.

It is furthermore of advantage that, due to the direct control of the process device by means of the local safety signal, the response time reduced hereby e.g. of a local safety sensor outputting the local safety signal is a constant system parameter. The response time is thus in particular independent of the configuration of the data transmission rate, of the safety bus system or of the logic used. Later logic expansions, e.g. in the MPC, or additional devices in the network, also advantageously remain without influence on the response time.

The locking subsequent to the fast change in state, which can be achieved using the fast switching function in accordance with the invention, furthermore makes it possible for the user to structure the program centrally in the usual manner in the safety MPC. It is not necessary to take the decentral fast switching function into account. All the safety signals, including those safety signals which act on the fast switching function and are evaluated together with the local safety signal can be logically linked to one another in accordance with the respective demands in the safety MPC. Then, only those switching signals have to be selected in the decentral or local control unit (output module) which should act on the local control output, i.e. on the process device to be controlled.

The concept of the fast switching function makes possible a simple retrofitting of existing plant with the corresponding safety devices. An existing program of a standard MPC can be maintained and the safety distances can simultaneously be reduced to hereby optimize process routines by the installation of a local control unit provided with the fast switching function in accordance with the invention.

Further preferred embodiments of the invention are set forth in the dependent claims, in the description and in the drawing.

As already indicated above, it is preferred for the fast switching function to be carried out in the local control unit.

The logical linking operation of the process signals of the process module not relevant to safety and of the safety signals of the safety module relating to the process safety can likewise take place in the local control unit. Alternatively, this logical linking operation can take place in a central or higher ranking safety module which is in particular provided in the form of a safety MPC.

As regards the process control system, the fast switching module is preferably integrated in the control unit. The logic module can be integrated into the control unit or into a central or higher ranking safety module, in particular into a safety MPC. It is furthermore preferred for the fast switching module to be connected before the control output of the control unit and in particular to be connected between the logic module and the control output.

As already indicated in the above, the logical linking operation of the process signals to the safety signals can take place either decentrally (locally), for example in the local or decentral control unit, or centrally, for example in a higher ranking safety MPC. Some of the following statements which relate to further embodiments of the invention only relate to the variant having a decentral or local logical linking operation; other statements relate to both variants and are thus independent of the location at which the logical linking operation takes place.

In accordance with an embodiment of the invention, at least one safety signal, which is logically linked to the process signals, is itself formed by a logical linking operation of safety signals relating to the process safety. A so-to-say decentralized safety control, which can generally be made as complex as desired, can hereby be realized with the help of the local control unit in the case of a local logical linking operation.

A particularly high degree of safety is achieved when, in accordance with a further embodiment of the invention, the logical linking operation between the process signals and the safety signals are designed such that a discrepant signal input pattern has the consequence of a remaining of the control output in a safe state.

The logical linking operation between the process signals and the safety signals is preferably designed as a logical AND link.

Accordingly, the logical linking operation of these safety signals is preferably designed as a logical AND link for the case that the safety signal to be linked to the process signals is itself formed by a logical linking operation of safety signals relating to the process safety.

Generally, however, the logical linking operation can adopt any desired form.

As already initially indicated, in a preferred embodiment of the process control system in accordance with the invention, at least the process module is connected to the local control unit via a field bus system.

In a so-called remote variant, the process module and the safety module are preferably arranged remote from the control unit and are connected to the control unit via a common communication system, in particular a field bus system.

In a so-called local variant, provision is preferably made for the process module to be arranged remote from the control unit and to be connected to the control unit via a central communication system, in particular a field bus system, and for the safety module, which is in particular provided in the form of a safety sensor, to be arranged locally in the region of the control unit and in particular remote from the process module and to be directly connected to the control unit.

The process module is preferably provided in the form of an MPC (memory programmable control).

The safety module is preferably provided in the form of a safety sensor, but can generally also include a safety control, in particular in the form of an MPC.

In accordance with a further embodiment of the invention, the control unit can include a plurality of safety inputs for safety signals which can be logically linked to one another by means of the logic module to form a resulting safety signal, with the resulting safety signal again being able to be logically linked to the process signals by means of the logic module.

For a further increase in safety, provision is preferably made for a plurality of channels, in particular two channels, to be provided in the control unit for at least one process device to be controlled, in particular for every process device to be controlled, said channels each being made for the logical linking operation of process signals and safety signals. Each channel can be made as an independent safety switch-off path so that a plurality of independent switch-off paths, in particular two such paths, are present for each process device to be controlled.

In accordance with a further embodiment of the invention, a third independent safety switch-off path can be realized in that the voltage supply for the control output of the control unit is provided separately from the logical signal path and/or from the voltage supply of the process device. In this manner, an additional possibility is provided to safely close down the control output.

Provision can furthermore be made in accordance with the invention for the process signals to be supplied to the control unit alternatively or additionally via local safety inputs and/or local signal inputs not directed to safety. The process data not directed to safety can therefore also be read in and linked by the local safety inputs or the signal inputs not directed to safety of the local control unit.

The invention will be described in the following by way of example with reference to the drawing. There are shown.

If nothing else is set forth, in the following, the terms starting with "process" such as process control, process data and process signals, have the meaning that there is no direct relation to safety aspects, i.e. the process control only relates to the actual working process and the process signals and/or process data do not contain any safety signals or safety data, but only represent so-called unsafe signals or data. It must still be remarked that the term "standard" is also used instead of the term "process" in practice to distinguish between the "process world" and the "safety world".

It is common to the three variants of the invention described in the following that a linking of process signals P of a process MPC 13 to safety signals S, S" of one or more safety modules 15, 15' takes place in a logic module 19, and indeed to safety signals S of a central or higher ranking safety MPC 15 (not in the variant of FIG. 3) as well as to safety signals S" of a local safety sensor 15'. With respect to the logical linking operation, there is a difference in that in the variants in accordance with FIGS. 1 and 3, the logic module 19 provided for this purpose is integrated into the local control unit 17, whereas in the variant in accordance with FIG. 4 the higher ranking safety MPC 15 includes a logic module 19.

The three described variants of the invention in turn coincide in that the result 35 of the logical linking operation is supplied to a fast switching module 31 of the local control unit 17 described in more detail below, where a common evaluation of this control signal 35 takes place with at least one local safety signal S' of the safety sensor 15', which will likewise be looked at in more detail in the following. The fast switching module 31 integrated into the control unit 17 in the embodiments is connected between the logic module 19 and the control output 21 of the control unit 17 to which the process device 11 to be controlled is connected.

As already mentioned above, the safety signals S" provided for the logical linking operation and the safety signals S' provided for the direct control of the process device 11 can be identical, with this, however, not being compulsory.

Figure 1:
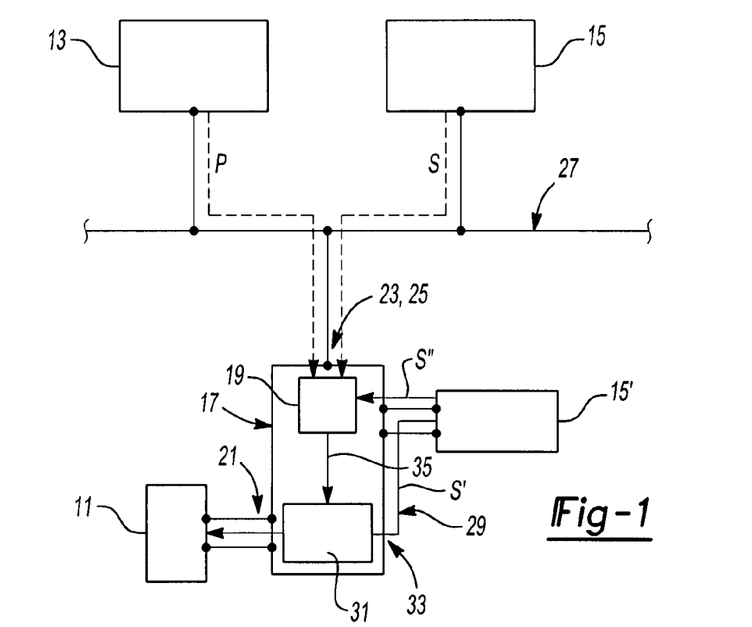
FIG. 1 schematically, a section of a process control system in accordance with the invention in a first variant.
Figure 4:
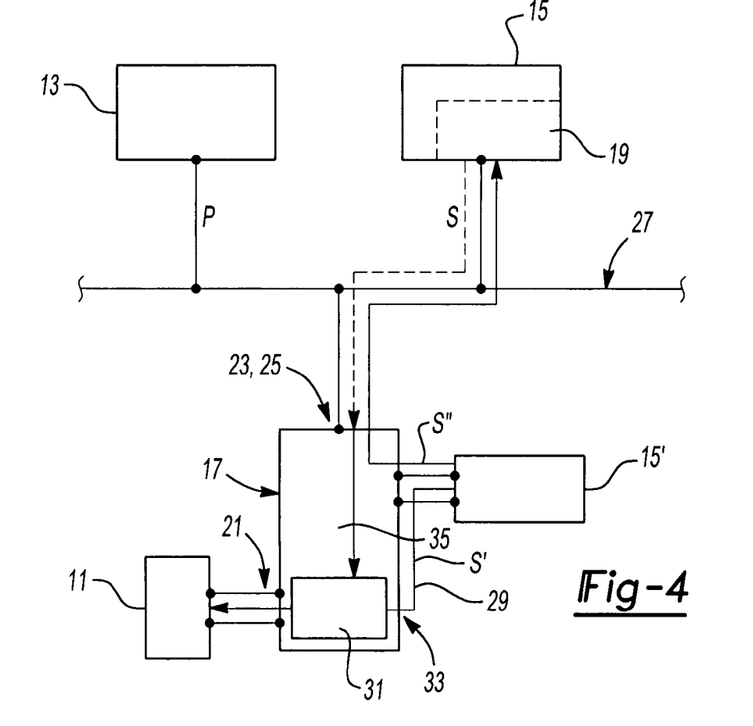
FIG. 4 schematically, a section of a process control system in accordance with the invention in a third variant.

In remote variants in accordance with FIGS. 1 and 4, a process MPC 13 and a safety MPC 15 communicate via a field bus system 27 with a control unit 17 which is connected to the field bus 27 via signal inputs 23, 25 and which has control outputs 21 directed to safety for process devices 11 to be controlled. The process devices 11 to be controlled can, for example, be actuators or motors of processing machines which carry out movements which can be dangerous to persons or also to capital goods under certain circumstances. To prevent such procedures critical for safety, the safety MPC 15 is provided, whereas the process MPC 13 controls the actual working process independent of safety aspects.

Only a control unit 17 is shown to which only a process device 11 is connected. Generally, the process control 13 and the safety control 15 can control any desired number of control units 17 connected to the field bus system 27 and thus any number of process devices 11. It is furthermore generally possible for a plurality of process devices 11 to be connected to a control unit 17. In this case, the control unit 17 is provided with a plurality of control outputs 21 directed to safety.

It is indicated in each case by the signal paths shown by broken lines in the Figures that the provision of a central communication system such as the field bus system 27 is not absolutely necessary, but that the process control 13 and the safety control 15 can also communicate directly with the control unit 17 which is in this case equipped with corresponding signal inputs.

Furthermore, in each of the three variants described, a safety sensor 15' is provided which is, for example, a light grid or another safety device of generally any type.

The safety sensor 15' delivers local safety signals S', S", which are supplied in the embodiment of FIG. 1, on the one hand, via a fast changing path 29 to the already mentioned fast switching module 31 (signals S') and, on the other hand—in addition to the process signals P and to the safety signals S of the higher ranking safety MPC 15—to the logic module 19 of the control unit 17 (signals S").

The control unit 17, which is arranged locally in the region of the respective process device 11 to be controlled and thus decentrally, has the already mentioned logic module 19 in which the process signals P coming from the process MPC 13, the safety signals S coming from the safety MPC 15 and the local safety signals S" coming from the safety sensor 15' are processed, which will be looked at in more detail in the following. As the result 35 of this signal processing operation, the logic module 19 makes safe control signals 35 available which are passed onto the fast switching module 31 and are passed on from there to the control output 21 of the control unit 17.

Figure 2:
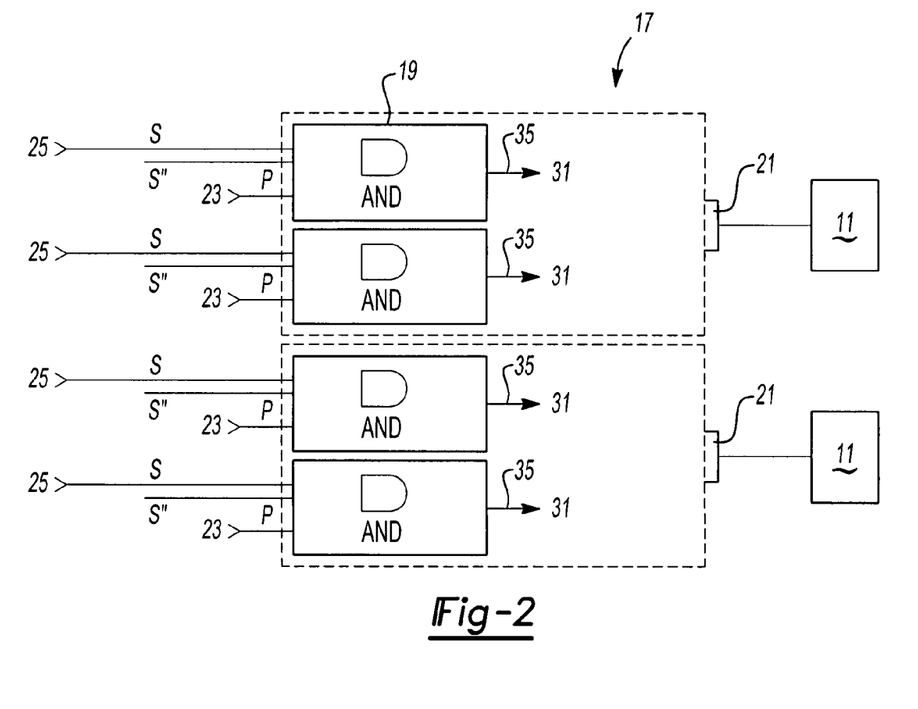
FIG. 2 schematically, a control unit being used in the system of FIG. 1.

FIG. 2 schematically shows the embedding of the logic module 19 of the control unit 17 into the process system. In the embodiment shown, a dual channel control is provided for each of the process devices 11 to be controlled, with the two channels each having an identical design. In each channel, the process data P supplied via a signal input 23, the safety data S supplied via a safety input 25 as well as the local safety data S" in the logic module 19 of the control unit 17 are subjected to a logical AND link. The corresponding local safety output 21 of the control unit 17 is controlled by the result 35 of this logical linking operation.

In this manner, for each channel, a signal S not directed to safety of the process MPC 13 (FIG. 1), which should act on the safe output 21 of the control unit 17, is subjected to a logical AND link with safety directed signals S, S" of the safety MPC 15 and of the safety sensor 15', which should act indirectly via the fast switching module 31 on the same safe output 21.

Since, in the embodiment described here, both the process signals P and the signals S directed to safety of the high ranking safety control 15 are transmitted to the control unit 17 via the industrial bus system 27, a safe bus protocol is used for the transmission of the safety signals S.

The logical AND link in the logic module 19 provides for the discrepant input patterns resulting in safe outputs remaining in the safe state, i.e. a continuous signal input pattern of ones is required to switch a safe output 21.

The fast switching module 31 integrated in the control unit 17 first allows a direct control of the control output 21 and thus of the process device 11 connected thereto by means of the local safety signal S' of the safety sensor 15'. The process device 11 can hereby, for example, be switched off with a very short response time of the safety sensor 15', when the safety sensor 15' transmits a corresponding local safety signal S'.

The fast switching module 31 additionally provides a fast switching function. This comprises evaluating the local safety signal S' together with the result 35 of the logical linking operation of the logic module 19 arriving delayed in time. This common evaluation can likewise be a logical linking operation. As already explained in the introductory part, a so-called restart inhibit can in particular be realized hereby. The switching back on of the process device 11 is delayed for so long on the basis of the fast switching function until both the local safety signal S' and the control signal 35 (result of the logical linking operation) again correspond to an active state, e.g. to a safe state represented by a logical "1".

However, the requirement for this is, on the one hand, that an unsafe state which is recognized by the safety sensor 15', is e.g. represented by a safety signal S' in the form of a logical "0" and results in a fast switching off of the process device 11, is confirmed by the logical linking operation, that is the control signal 35, in that it e.g. likewise corresponds to a logical "0". On the other hand, it is necessary for the transition of the safety sensor 15' to a safety state—e.g. after the ending of an intervention into a light grid forming the safety sensor 15'—likewise to be acknowledged by the control signal 35. The switching back on of the process device thus only takes place when the local safety signal S' and the control signal 35 report a safe state (logical "1").

In this only exemplary procedure, a coinciding development (e.g. sequence of logical "0" and "1" states) for the control signal 35 as the result of the logical linking operation and the local safety signal S' is thus a requirement for a repeat change in state.

Figure 3:
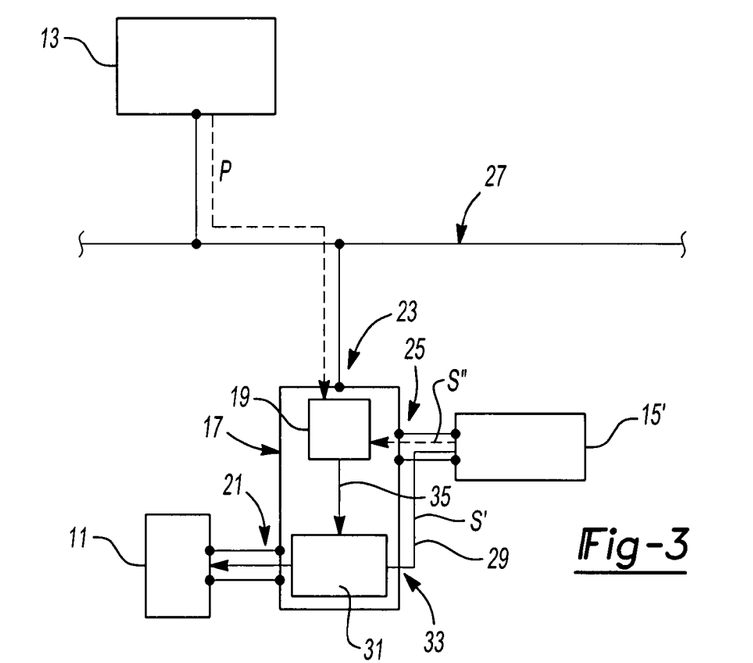
FIG. 3 schematically, a section of a process control system in accordance with the invention in a second variant.

In the local variant in accordance with FIG. 3, unlike the remote variants explained above, only a local safety module is provided which is configured as a safety sensor 15. The safety sensor 15' is not connected to the control unit 17 via the field bus system 27 via which the process MPC 13 communicates with the control unit 17, but the safety sensor 15' communicates according to the variants in FIGS. 1 and 4 directly with the control unit 17.

The local safety signals S', S" of the safety sensor 15' are in turn provided directly via the fast switching module 31 at the control output 21 of the control unit 17 as well as logically linked to the process signals P of the process module 13 in the logic module 19 of the control unit 17.

The safety directed control of the control output 21 thus takes place here only by the local safety signals S', S".

In this local variant, any desired number of control units 17 can also be provided which each control one or more process devices 11 and to which the respective one or more safety modules 15 are connected.

In accordance with the invention, a mixed system design is generally also conceivable in which one or more local control units 17 receive safety signals S from a remote safety module 15 (corresponding to FIGS. 1 and 4; so-called RSR (remote safety release)) and one or more further control units 17 are each directly connected to one or more local safety modules 15 (corresponding to FIGS. 3 and 4; so-called LRS (local safety release)).

In the variant in accordance with FIG. 4, the logic module 19 is not provided in the local control unit 17, but the logical linking operation of the process signals P to the local safety signals S" takes place in the higher ranking safety MPC 15 which is provided in addition to the local safety sensor 15'. The result of the logical processing operation, that is the control signal 35, is provided to the control unit 17 and thus to the fast switching module 31 by the safety MPC 15.

The invention can generally be realized on all existing industrial bus systems, for example on the bus systems with the names Profibus, Interbus and DeviceNet as well as on Ethernet derivatives. The invention is moreover also suitable for all future mixed bus systems which permit a transmission both of process data and safety data.

The realization of the RSR function described above with reference to FIGS. 1 and 4 can, for example, be implemented for the bus systems DeviceNet and DeviceNet Safety. For this purpose, a standard DeviceNet connection is established for the exchange of the process data between the safety module also designated as the remote output module (target) and the process module also designated as the standard control (originator). The unsafe input data for the RSR function can be delivered via this connection by means of a so-called manufacturer-specific output assembly. Furthermore, a safe communication link is built up between the control unit and the safety MPC. The safe input data for the RSR function are transmitted via this communication connection by means of an output assembly corresponding to the DeviceNet device profile.

The LSR function described above in connection with FIG. 3 can also be implemented, for example, for the bus system DeviceNet. For this purpose, a standard DeviceNet link is in turn established to provide the exchange of the process data between the target (control unit) and the originator (process MPC). The unsafe input data for the LSR function can then be delivered via this connection by means of a manufacturer-specific output assembly. The safety signals required for the consent directed to safety are then generated by the safety sensors locally connected to the control unit.

REFERENCE NUMERAL LIST 11 process device, actuator
13 process module, process MPC
15 safety module, safety MPC
15' safety module, safety sensor
17 control unit, output module
19 logic module
21 control output of the control unit
23 signal input of the control unit
25 signal input of the control unit
27 communication system, field bus system
29 fast switching path
31 fast switching module
33 local safety input
35 result of the logical linking operation, control signal
P process signal of the process module
S safety signal of the safety module
S', S" local safety signal

The invention claimed is:

1. A method for process control, comprising:
controlling at least one process device by at least one process module and at least one safety module;
logically linking to one another process signals (P) of the process module not relevant to safety and safety signals (S, S', S") of the safety module relating to process safety, wherein the process signals and the safety signals are logically linked to one another in a logical linking operation; and
supplying directly via a fast switching path at least one local safety signal (S') of a local safety sensor to at least one control output of a local control unit associated with the process device, wherein the supplying occurs while bypassing the logical linking operation in order to effect a fast change in state at the process device to be controlled which is connected to the control output,
wherein the fast switching path includes a fast switching function with which a result of the logical linking operation and the local safety signal (S') are evaluated together in a common evaluation, and
wherein a fast change in state at the process device effected via the fast switching path is changed again, and is reversed again, when the common evaluation produces a predetermined result.

2. The method in accordance with claim 1,
wherein a fast change in state at the process device is only changed again if the fast change in state is confirmed by the result of the logical linking operation, and
wherein the fast switching path is changed again only when the local safety sensor has changed to a safe state, in accordance with a state before transmission of the local safety signal (S'), and when the state has likewise been confirmed by the result of the logical linking operation.

3. The method in accordance with claim 1, wherein the fast switching function is carried out in the local control unit.

4. The method in accordance with claim 1, wherein the logical linking operation takes place in the control unit.

5. The method in accordance with claim 1, wherein the logical linking operation takes place in one of a central safety module, a higher ranking safety module, a central safety memory programmable control (MPC), and a higher ranking safety MPC.

6. A system for process control, comprising:
at least one process device to be controlled;
at least one process module;
at least one safety module, wherein the process device is connected to the control output of a local control unit associated with the process device;
a logic module in which process signals (P) of the process module not relevant to safety and safety signals (S, S") of the safety module relating to process safety can be logically linked to one another;
at least one local safety input of which a local safety signal (S') of a local safety sensor can be supplied directly to the control output of the control unit while bypassing the logic module to effect a fast state change at the process device to be controlled; and
a fast switching module with which the result of the logical linking operation and the local safety signal (S') supplied via the local safety input can be evaluated together in a common evaluation, wherein the fast switching module is configured to again change an effected fast change in state in order to reverse the effected fast change in state at the process device to be controlled, when the common evaluation produces a predetermined result.

7. The system in accordance with claim 6, wherein the fast switching module is integrated into the control unit.

8. The system in accordance with claim 6, wherein the local safety input is provided at the control unit.

9. The system in accordance with claim 6, wherein the logic module is integrated into the control unit.

10. The system in accordance with claim 6, wherein the logic module is integrated into one of a central safety module, a higher ranking safety module, a central memory programmable control (MPC), and a higher ranking safety MPC.

11. The system in accordance with claim 6, wherein the fast switching module is connected between the logic module and the control output of the control unit.

12. The system in accordance with claim 6, wherein at least the process module is connected to the control unit via a field bus system.

13. The system in accordance with claim 6, wherein the process module and the safety module are arranged remote from the control unit and are connected to the control unit via a common communication system, that corresponds to a field bus system.

14. The system in accordance with claim 6,
wherein the process module is arranged remote from the control unit and is connected to the control unit via a central communication system that corresponds to a field bus system, and
wherein the safety module is arranged locally in a region of the control unit remote from the process module and is directly connected to the control unit.

15. The system in accordance with claim 6, wherein the safety module includes a safety control that corresponds to a memory programmable control (MPC).

16. The system in accordance with claim 6, wherein the safety module includes at least one safety sensor.

* * * * *

UNITED STATES PATENT AND TRADEMARK OFFICE
CERTIFICATE OF CORRECTION

PATENT NO. : 7,636,606 B2
APPLICATION NO. : 11/890711
DATED : December 22, 2009
INVENTOR(S) : Franz Dold et al.

It is certified that error appears in the above-identified patent and that said Letters Patent is hereby corrected as shown below:

Column 3, Line 12, "reduced" should be --reduce--.

Column 5, Line 37, "particular in shown" should be --particular shown--.

Column 6, Line 26, Insert --to-- after "regards".

Column 12, Line 56, Insert --and-- after "unit".

Signed and Sealed this

Thirteenth Day of April, 2010

David J. Kappos
*Director of the United States Patent and Trademark Office*